(12) United States Patent
Vauchel et al.

(10) Patent No.: US 8,523,516 B2
(45) Date of Patent: Sep. 3, 2013

(54) BYPASS TURBOJET ENGINE NACELLE

(75) Inventors: Guy Bernard Vauchel, Le Havre (FR); Jerome Collier, Le Havre (FR); Patrice Dhainault, Ste Adresse (FR); Francois Conte, Tournefeuille (FR); Nicolas Hillereau, Le Havre (FR); Pierre-Alain Chouard, Paris (FR); Guillaume Lefort, Paris (FR)

(73) Assignee: Aircelle, Gonfreville L'Orcher (FR)

( * ) Notice: Subject to any disclaimer, the term of this patent is extended or adjusted under 35 U.S.C. 154(b) by 848 days.

(21) Appl. No.: 12/445,421

(22) PCT Filed: Oct. 5, 2007

(86) PCT No.: PCT/FR2007/001633
§ 371 (c)(1),
(2), (4) Date: Apr. 13, 2009

(87) PCT Pub. No.: WO2008/043903
PCT Pub. Date: Apr. 17, 2008

(65) Prior Publication Data
US 2010/0040466 A1 Feb. 18, 2010

(30) Foreign Application Priority Data

Oct. 11, 2006 (FR) .................................. 06 08892
Mar. 16, 2007 (FR) .................................. 07 01899

(51) Int. Cl.
*F03B 11/08* (2006.01)
*F03B 1/00* (2006.01)
*F01D 5/00* (2006.01)
*F01D 25/28* (2006.01)
*F04D 29/44* (2006.01)

(52) U.S. Cl.
USPC ............... 415/121.2; 415/213.1; 415/220; 415/208.2

(58) Field of Classification Search
USPC ............... 415/121.2, 213.1, 220, 181, 148, 415/123, 208.2, 201, 215.1; 416/223 A
See application file for complete search history.

(56) References Cited

U.S. PATENT DOCUMENTS

| | | | |
|---|---|---|---|
| 5,277,382 A | | 1/1994 | Seelen et al. |
| 5,497,961 A | * | 3/1996 | Newton .......................... 244/54 |
| 5,524,847 A | * | 6/1996 | Brodell et al. .................. 244/54 |
| 2004/0245383 A1 | * | 12/2004 | Udall .............................. 244/54 |
| 2009/0266932 A1 | * | 10/2009 | Roche et al. .................... 244/54 |

FOREIGN PATENT DOCUMENTS

| | | |
|---|---|---|
| EP | 0 733 545 | 9/1996 |
| EP | 0 787 895 | 8/1997 |
| EP | 0 884 469 | 12/1998 |
| EP | 0 913 569 | 5/1999 |

(Continued)

OTHER PUBLICATIONS

International Search Report; PCT/FR2007/001633; May 14, 2008.

*Primary Examiner* — Chuong A. Luu
(74) *Attorney, Agent, or Firm* — Brinks Hofer Gilson & Lione

(57) ABSTRACT

The nacelle (1) comprises an air intake (5) upstream of the turbojet engine (2), a middle section (6) an internal casing (6*a*) of which is intended to surround a fan (3) of the turbojet engine (2), and a downstream section (7) comprising an external structure (7*a*) which is rigidly connected to a downstream part of the casing (6*a*) of the fan (3) so as to support the turbojet engine (2) and has means of attachment to a strut (12) intended to be connected to a fixed structure (13) of an aeroplane.

28 Claims, 7 Drawing Sheets

(56) References Cited

FOREIGN PATENT DOCUMENTS

| | | |
|---|---|---|
| FR | 2 873 988 | 2/2006 |
| FR | 2 885 877 | 11/2006 |
| GB | 2 275 308 | 8/1994 |
| WO | 93/02920 | 2/1993 |

* cited by examiner

BYPASS TURBOJET ENGINE NACELLE

FIELD OF THE INVENTION

The present invention relates to a nacelle for a bypass turbojet and a propulsion assembly comprising such a nacelle.

BACKGROUND OF THE INVENTION

An aircraft is propelled by several turbojets each housed in a nacelle also accommodating a set of associated actuation devices linked to its operation, such as a thrust reverser device, and performing various functions when the turbojet is in operation or stopped.

A nacelle usually has a tubular structure comprising an air intake upstream of the turbojet, a middle section designed to surround a fan of the turbojet, a downstream section accommodating thrust reversal means and designed to surround the combustion chamber of the turbojet, and is usually terminated by an exhaust nozzle the outlet of which is situated downstream of the turbojet.

Modern nacelles are designed to accommodate a bypass turbojet capable of generating, by means of the blades of the fan in rotation, a flow of hot air (also called the main flow) originating from the turbojet combustion chamber and a flow of cold air (the bypass flow) which flows outside the turbojet through an annular passageway, also called a stream, formed between a fairing of the turbojet (or an internal structure of the downstream structure of the nacelle and surrounding the turbojet) and an internal wall of the nacelle. The two air flows are discharged from the turbojet through the rear of the nacelle.

Each propulsion assembly of the aircraft is therefore formed by a nacelle and a turbojet, and is suspended from a fixed structure of the aircraft, for example beneath a wing or on the fuselage, by means of a pylon, or mast, attached to the turbojet in its front and rear portion by suspension elements.

In such a configuration, it is the turbojet that supports the nacelle.

Such an architecture is subjected to many combined external forces during the mission of the aircraft. They are, amongst others, resultant forces of gravity, external and internal aerodynamic forces, gusts of wind and thermal effects.

These stresses applied to the propulsion assembly are transmitted to the turbojet and cause deformations of casings which have a direct impact on the efficiency of the various stages of the turbojet. More particularly, in the case of a propulsion assembly called wasp-waisted, that is to say having a downstream portion that is long and thinner than the intermediate structures and air intake, these stresses result in a deformation that is particularly harmful called "banana-shaping", the downstream portion curving considerably.

Such "banana shaping" is reflected by a deformation of the external structure of the nacelle formed by the various successive casings while the drive shaft, the fan blades and the blades inside the turbojet remain rectilinear. The result of this is that the blade tips of the shaft move closer to the internal periphery of the casings. The general performance of the turbojet is thereby reduced relative to a configuration in which the casings sustain very little deformation or none at all, because account must then be taken of this deformation in the design of the nacelle so as to always arrange a sufficient clearance between the blade tips and the periphery of the casings. This results in a portion of the supply air not being compressed by the blades because it escapes through this considerable clearance.

The French Patent application that is not yet published and registered under number 06.05912 proposes a solution consisting in supporting the propulsion assembly by means of an internal fixed structure of the nacelle (known as the IFS).

BRIEF SUMMARY OF THE INVENTION

The present invention proposes another solution making it possible to prevent the disadvantages mentioned above, and for this purpose its subject is a nacelle for a bypass turbojet comprising an air intake upstream of the turbojet, a middle section, an internal casing of which is designed to surround a fan of the turbojet, and a downstream section, comprising an external structure, which is rigidly connected to a downstream portion of the casing of the fan so as to support the turbojet and has coupling means capable of allowing the nacelle to be attached to a pylon designed to be connected to a fixed structure of an aircraft.

Therefore, the external structure of the nacelle is directly attached to the fixed structure of the aircraft and supports the turbojet. In this manner, the turbojet does not have to sustain and transmit the deformations of the nacelle and vice versa. As explained above, it is then possible to optimize the clearance that exists between the fan blades and blades inside the turbojet and their respective casing in order to enhance the performance of the propulsion assembly.

Advantageously, the nacelle comprises a structure of the pylon type incorporated into the external structure and capable of allowing its attachment to the pylon. The pylon extends for example over the whole length of the external structure.

The turbojet may be surrounded by a primary cowl attached upstream of the body of the turbojet and centered downstream around an exhaust nozzle of the turbojet, independently of the nacelle external structure. Since the primary cowl fulfils no structural role, it may therefore be lightened to the maximum, namely its whole surface may be dedicated to the acoustic function without it being necessary to provide high-density structural zones which prevent any acoustic function.

According to one possibility, the nacelle according to the invention comprises at least one link rod or, preferably two or three, link rods for absorbing the torque forces generated by rotating members of the turbojet, said link rod or rods connecting the pylon to an external downstream structure of the turbojet and being placed symmetrically relative to a longitudinal plane of symmetry of the nacelle.

The force-absorbing link rod or rods advantageously have an aerodynamic profile. This link-rod clearance participates in the holding of the turbojet by the nacelle.

The system of link rods is rigidly mounted between the structures just like the current installations of this type of component. In certain cases of use, it may be advantageous to provide an installation of this "flexible" system, consisting on one of the coupling sides in a clearance or a material in flexible or deformable contact, which does not contribute much or at all to the loading at the rear of the engine structure, the system of link rods coming into contact in certain extreme cases of flight in order to limit the differential movements between them of the carrying and carried structures.

According to one possibility, at least one radial pillar for connecting the body of the turbojet to the casing of the fan, notably in the top portion of the latter, is associated with a fairing provided to carry (electrical, electronic or fuel) supply ducts of the turbojet.

Such a fairing arrangement of the radial pillar is shown in greater detail in Patent EP 0 884 469.

The external structure may form a fixed cowling comprising a notably trellis framework.

The nacelle external structure may comprise a thrust reverser device, the connection of the turbojet to the mast or pylon being provided by means of a fixed upstream structure of the reverser.

The thrust reverser device is for example a grille reverser.

According to one possibility, the fixed upstream structure of the grille reverser comprises an upstream end element for supporting the turbojet and a downstream end element for immobilizing the grilles, both of which being connected by a strengthening trellis placed above or below the grilles.

Guide rails for a movable cowl of the reverser may be incorporated into the pylon, without requiring interface components. The rectilinear geometric shape of the pylon makes this integration easier. Other reverser functions may also be incorporated into the pylon, which makes it possible to reduce the weight of the nacelle.

The thrust reverser device may also be a door reverser.

According to a possible embodiment, a movable cowl of the reverser has a strengthened structure connecting, (respectively) for example in the bottom portion, at least one locking point of the fixed upstream structure of the reverser with, (respectively) for example in the top portion, a fixed point of the pylon. This arrangement makes it possible to assist or lighten the fixed upstream structure of the reverser.

A locking device, preferably electric and able to be actuated remotely, of the movable cowl of the reverser may be provided at said fixed point of the pylon.

The present invention may also comprise enhancements of the assembly described above, enhancements in particular allowing a weight saving and better access to the engine body for maintenance operations.

This object of the invention is achieved by providing notably for a portion of the downstream section to be rigidly connected to the rear portion by means of a connecting structure suitable for being mounted on the downstream edge of said casing on the one hand and on a pylon on the other hand.

Advantageously, at least one portion of said connecting structure is interrupted over at least a portion of the circumference of this structure.

This feature makes it possible to reduce the weight of the connecting structure relative to the configuration described in Patent Application FR 6 08892, in which the connecting structure completely surrounds the downstream edge of the fan casing.

As confirmed by modeling tools, even though it does not extend over the whole circumference of the downstream edge of the fan casing, the connecting structure according to the invention makes it possible to achieve the desired robustness, using an appropriate design.

Furthermore, the interruption of the connecting structure over a portion of the downstream edge of the fan casing makes it easier to access the engine body during maintenance operations, and optionally to install at least one protection door for this engine body (see below).

According to other optional features of the present invention:

- said interrupted portion of said connecting structure is situated between 4 o'clock and 8 o'clock: this arrangement produces an optimal compromise between the weight of the connecting structure and its robustness, and allows good transmission of the forces between the downstream edge of the fan casing and the connecting structure;
- said nacelle comprises at least one door designed to allow access to the engine body of said turbojet, placed in the zone of interruption of said connecting structure, and in the continuity of this structure: this access door makes it possible, in operation, to protect the engine body and, during maintenance operations, to facilitate access to the engine body;
- this nacelle comprises two access doors to said engine body, mounted so as to pivot about shafts situated respectively at 4 o'clock and 8 o'clock: such an arrangement allows easy access to the underside of the engine body;
- said connecting structure comprises two concentric annular elements connected together by braces placed in a triangular manner, one of these two elements being designed to be fixed to the downstream edge of said casing of the fan: such a "trellis" geometry produces an excellent weight/robustness compromise;
- the annular element designed to be fixed to the downstream edge of said casing is continuous over all its circumference, the other annular element being interrupted over a portion of its circumference, said braces being placed in the circumferential zone common to these two annular elements: this arrangement provides increased firmness of the attachment of the connecting structure to the downstream edge of the fan casing;
- this nacelle comprises a thrust reverser comprising grilles placed in the spaces situated between said braces, and a cowl capable of being mounted slidably on said pylon: this arrangement of the grilles in the braces optimizes the space requirement;
- said cowl can be moved to an extreme position allowing the maintenance of said turbojet: this arrangement allows easy access to all the portions of the engine body for maintenance operations;
- this nacelle comprises two strengthening connecting rods capable of being interposed diagonally between said connecting structure and said pylon: these link rods make it possible to consolidate the connection between the pylon and the connecting structure;
- this nacelle comprises at least one thrust-absorbing stay capable of being interposed between the body of the engine of said turbojet and said pylon: this stay contributes to the correct hold of the turbojet relative to the connecting structure, under the effect of the thrust forces;
- said connecting structure may, for example, be made of composite material: here again, this solution makes it possible to optimize the weight/robustness compromise (a metal structure could also be envisaged).

The present invention also relates to a propulsion assembly comprising a nacelle according to the invention, and to an aircraft comprising at least one such propulsion assembly.

BRIEF DESCRIPTION OF THE FIGURES

The implementation of the invention will be better understood with the aid of the detailed description that is set out below with respect to the appended drawing in which.

Figure 10:
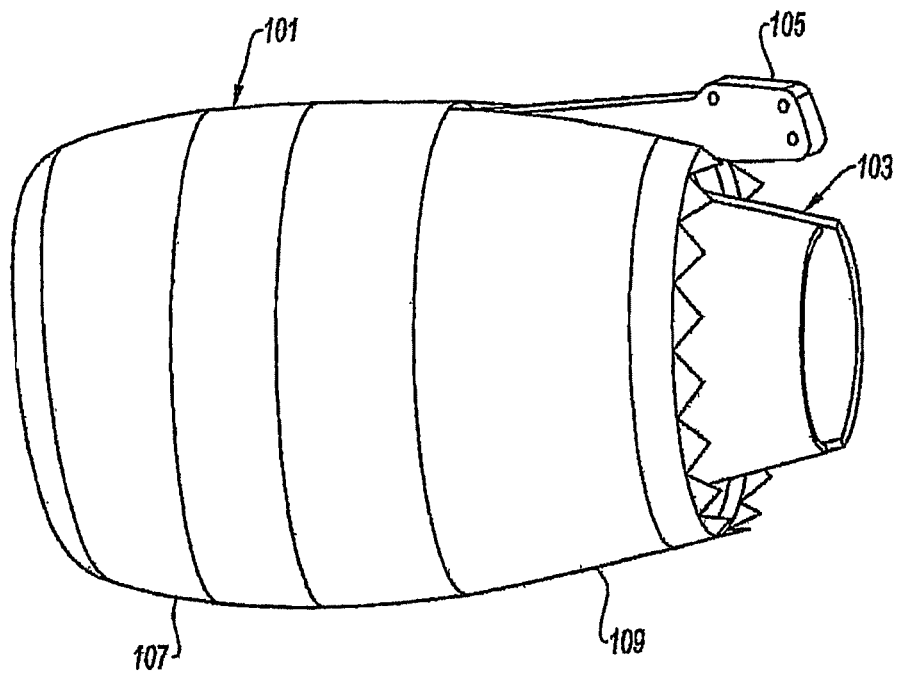
Figure 11:
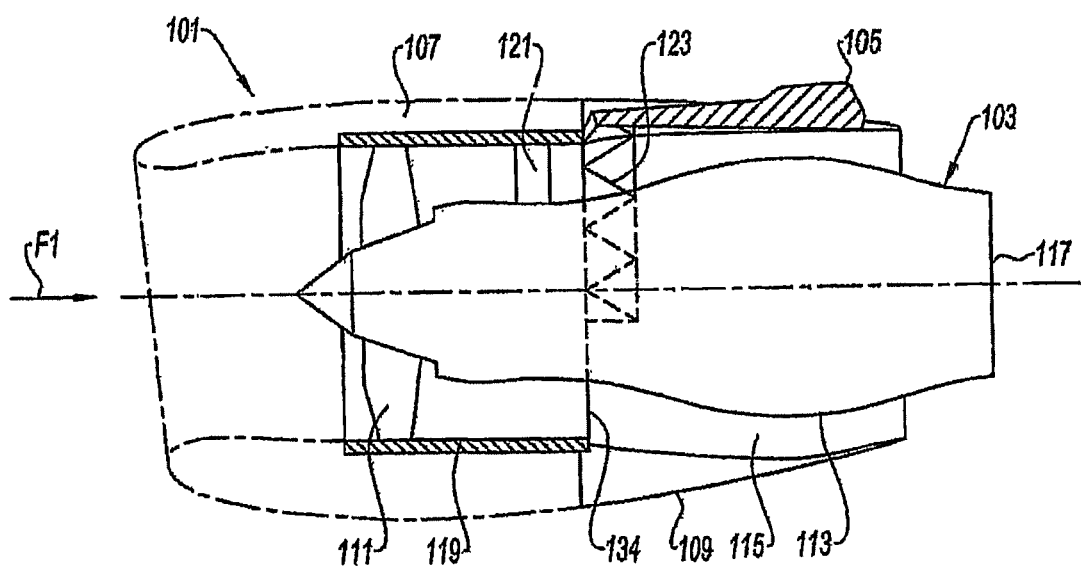
Figure 12:
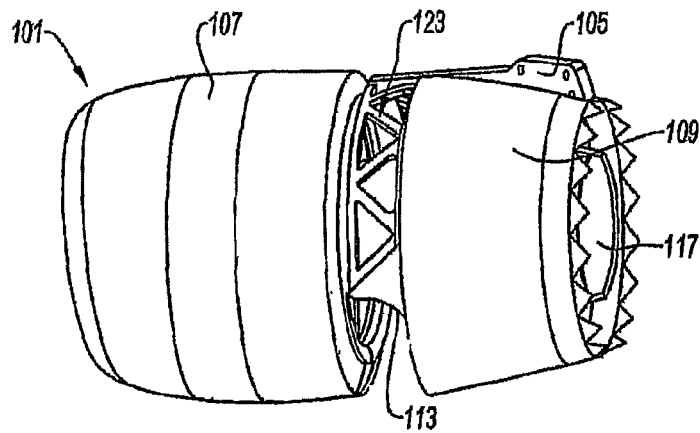
Figure 13:
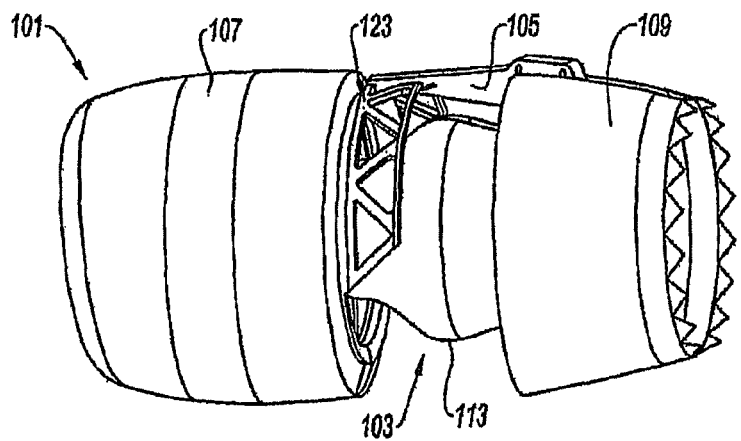
Figure 14:
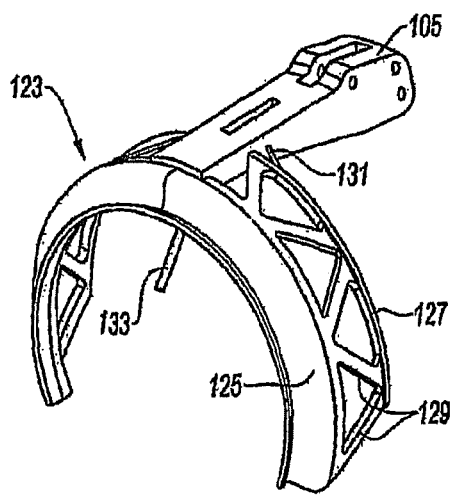
Figure 15:
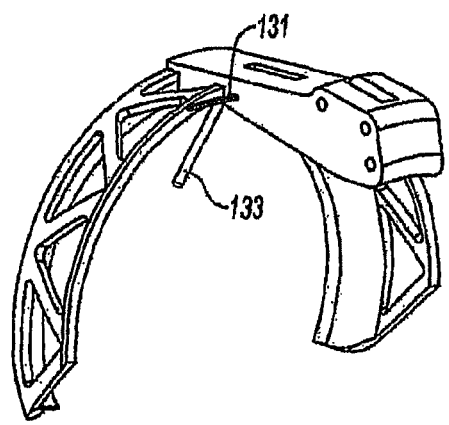
Figure 16:
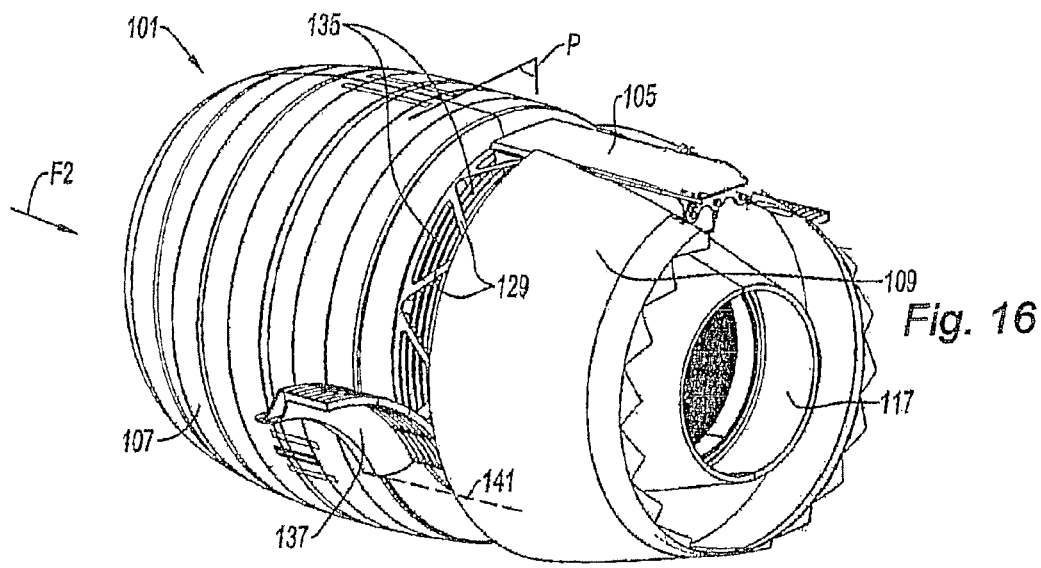
Figure 17:
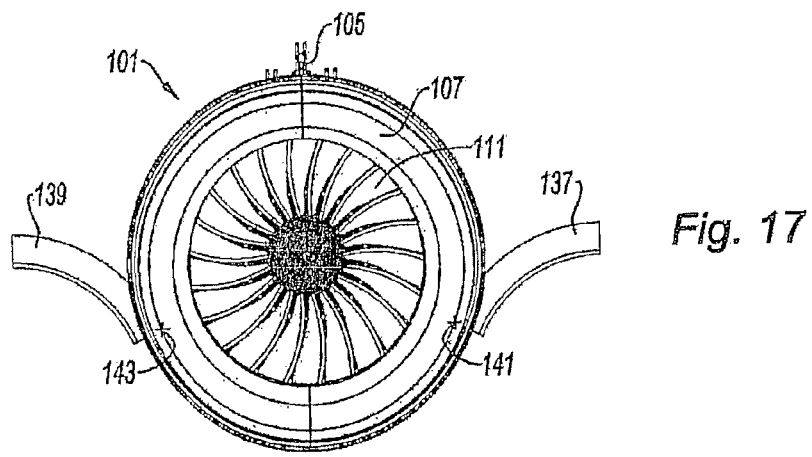
Figure 18:
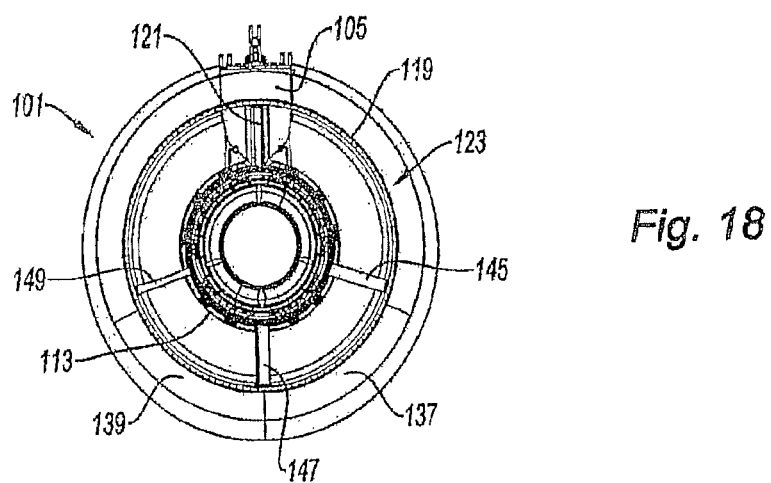

The abovementioned enhancements will also emerge from the description of a particular embodiment of the invention shown in FIGS. 10 to 18, in which:

FIG. 10 is a side view of a propulsion assembly according to the invention, in the normal operating position, FIG. 11 is a view in axial section of this propulsion assembly, FIG. 12 is a view of this propulsion assembly operating in thrust-reverser mode, certain members not being shown (for the purposes of clarity), FIG. 13 is a view of this propulsion assembly in the maintenance position, certain members not being shown (for the purposes of clarity), FIGS. 14 and 15 are views in perspective from two different angles of the means supporting the propulsion assembly according to the invention, FIG. 16 is a view in perspective of the propulsion assembly according to the invention fitted with thrust-reverser grilles and doors for protecting the engine body, one of these doors being shown in the open position, FIG. 17 is a view in the direction of the arrow F of FIG. 16 of this propulsion assembly, two doors being shown in the open position, and FIG. 18 is a view in section taken on the plane P of FIG. 16 of this propulsion assembly.

DETAILED DESCRIPTION OF THE INVENTION

Figure 1:
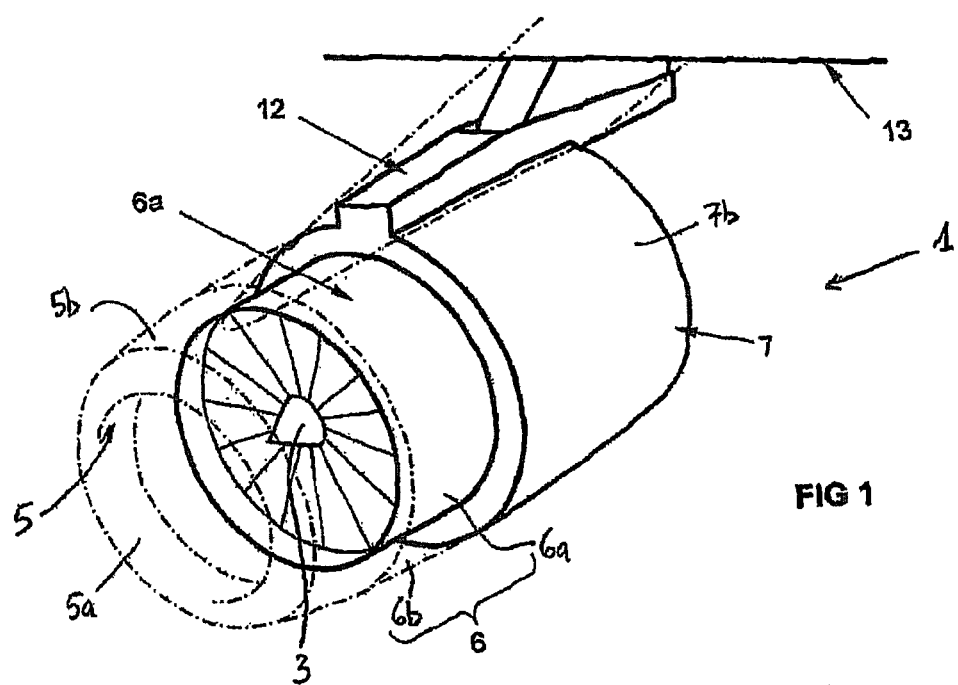
FIG. 1 is a schematic representation in perspective of a nacelle according to the invention attached to a pylon by means of an internal structure surrounding the turbojet.
Figure 2:
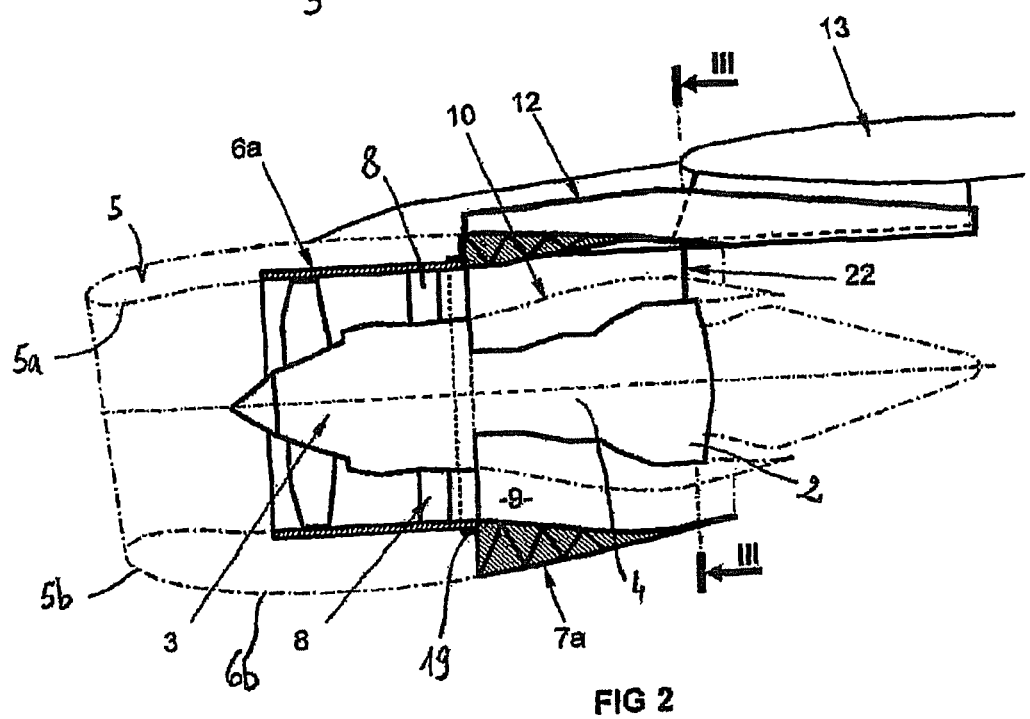
FIG. 2 is a view in longitudinal section of the nacelle of FIG. 1.

FIGS. 1 and 2 represent a nacelle 1 for a bypass turbojet 2.

The nacelle 1 constitutes a tubular housing for a bypass turbojet 2 and is used to channel the air flows that it generates by means of blades of a fan 3, namely a flow of hot air passing through a combustion chamber 4 of the turbojet 2, and a flow of cold air flowing outside the turbojet 2.

The nacelle 1 has a structure comprising a front section forming an air intake 5, a middle section 6 surrounding the fan 3 of the turbojet 2, and a rear section 7 surrounding the turbojet 2. The air intake 5 has an internal surface 5a designed to channel the incoming air and an external fairing surface 5b. The middle section 6 comprises, on the one hand, an internal casing 6a surrounding the fan 3 of the turbojet 2, and, on the other hand, an external fairing structure 6b of the casing extending the external surface 5b of the air intake section 5.

The casing 6a is attached to the air intake section 5 and extends its internal surface 5a. In addition, the casing 6a is connected to the body of the turbojet 2 by means of radial pillars 8 in this instance placed in a cross (see FIG. 2).

The rear section 7 of the nacelle comprises an external structure 7a a top portion of which is attached to a pylon (also called a mast) 12 over the whole of its length, the pylon 12 itself being attached to a fixed portion of an aircraft such as a wing 13. The pylon 12 may be attached by any means or the nacelle may incorporate a pylon structure, by which it is attached to the actual pylon 12.

The external structure 7a is in this instance a fixed cowling which holds the turbojet 2 at the downstream of the casing 6a surrounding the fan 3. The fixed cowling 7a comprises an internal trellis framework connecting an external surface to an internal surface. The whole of the framework forms a body with an upstream portion of the cowling 7a and is connected to the structure of the casing 6a by a fitting 19, by bolting or by any other known means of structural connection with or without rapid access. The cowling 7a may be made in a single block or in two parts connected at the bottom portion by bolts or by fasteners.

The turbojet 2 is supplied electrically, with fuel or electronically from the aircraft via the top portion of the cowling 7a.

The turbojet 2 is surrounded by a primary, non-structural cowl 10 attached upstream of the body of the turbojet 2 and centered downstream around an exhaust nozzle of the turbojet 2. The primary cowl 10, in the form of a complete collar, is independent of the external cowling 7a and defines with the latter a stream 9 intended for the circulation of the cold flow.

Since the primary cowl 10 fulfils no structural role, it may therefore be lightened to the maximum, namely its whole surface may be dedicated to the acoustic function without it being necessary to provide high-density structural zones which prevent any acoustic function.

The primary cowl 10 is formed of at least two portions designed to be attached together. Access to the engine may be achieved either by removing the primary cowl 10 entirely, or by removing a portion of the cowl 10 or of specific access panels incorporated into the primary cowl 10.

Figure 3:
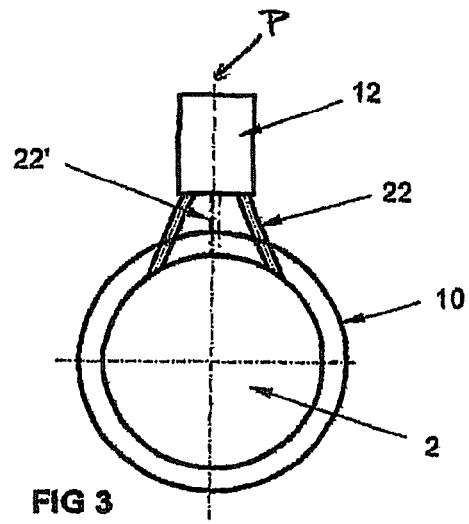
FIG. 3 is a view in cross section on the axis III-III of FIG. 1.

A portion of the rear structure of the turbojet 2, such as for example an exhaust casing, is suspended from a bottom portion of the pylon 12 by two lateral link rods 22 and an auxiliary central link rod 22' provided in case one or other of the lateral link rods 22 fails. The link rods 22 and 22', placed symmetrically relative to a longitudinal vertical plane P of symmetry of the nacelle 1, in this instance in a "pyramid" (see FIG. 3), are used to absorb the torque forces generated by rotating members of the turbojet 2. These link rods 22 and 22' preferably have an aerodynamic profile because they are in the stream 9 of circulation of the cold flow.

Figure 4:
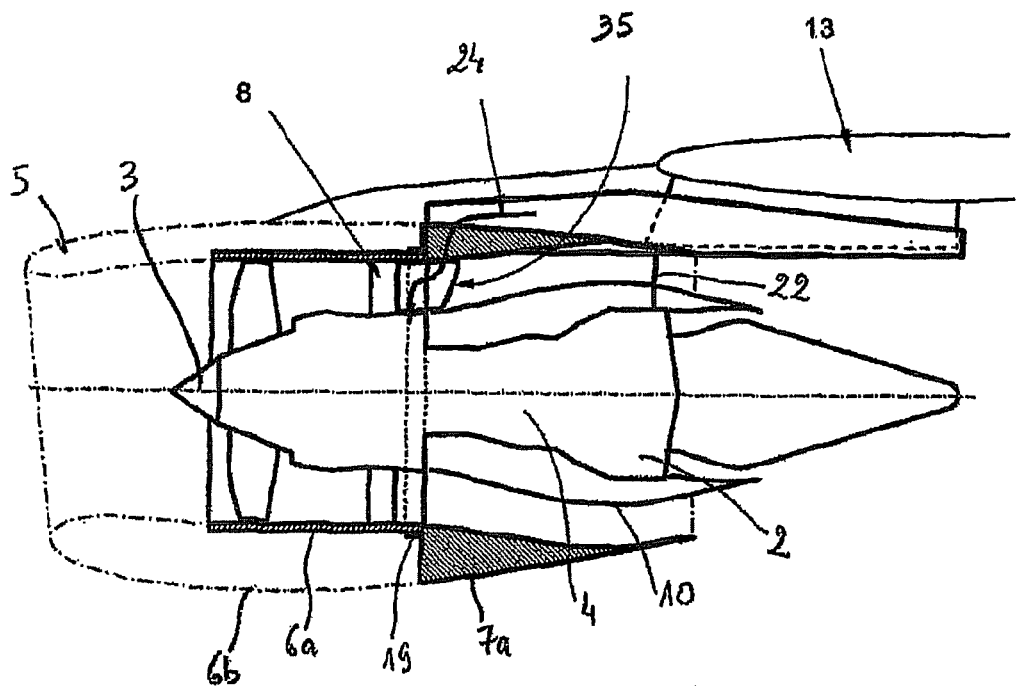
FIG. 4 is a view similar to FIG. 2 of a second embodiment of the invention.
Figure 5:
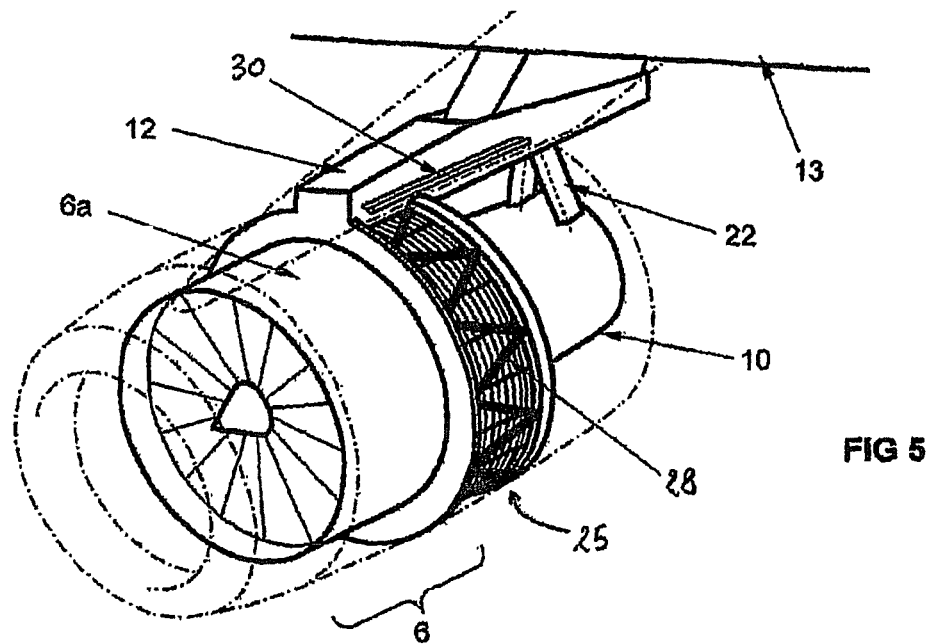
FIG. 5 is a view similar to FIG. 1 of a third embodiment of the invention.
Figure 6:
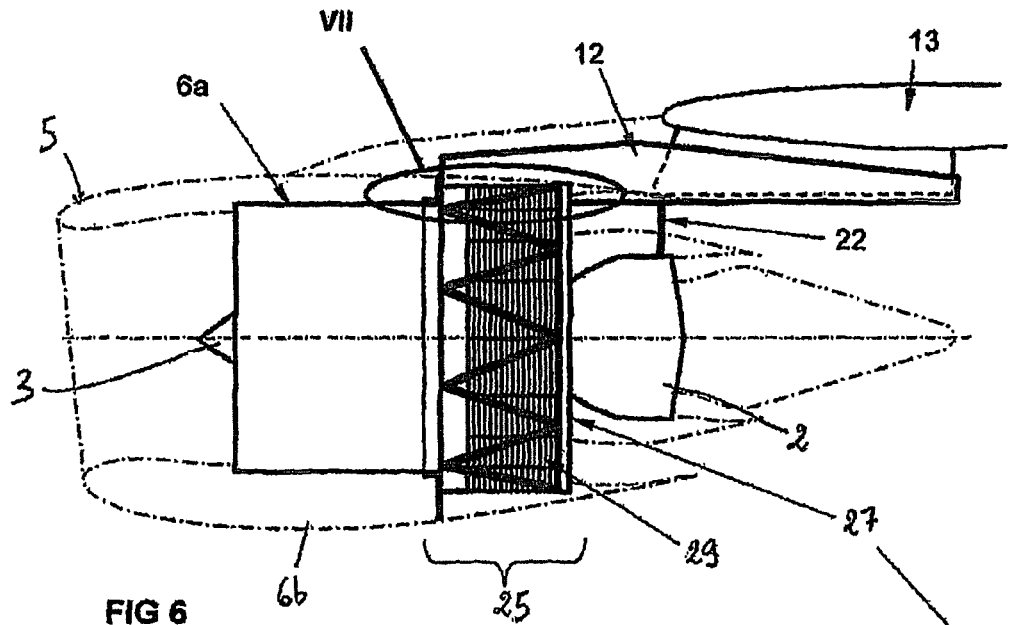
FIG. 6 is a longitudinal side view of the nacelle of FIG. 5.
Figure 7:
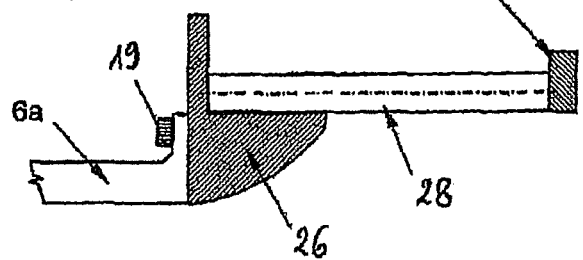
FIG. 7 is a view on a larger scale of a detail VII of FIG. 6.

As emerges from FIG. 4, one of the pillars 8 connecting the body of the turbojet 2 to the fan casing 6a, in the top portion of the latter, is associated with a fairing 35. The fairing 35 is provided to carry the supply ducts 24 (electric, electronic or fuel) of the turbojet. Such an arrangement of fairing 35 is shown in greater detail in patent EP 0 884 469.

FIGS. 5 to 7 and FIG. 8 show two embodiments of the invention in which the external structure 7a forms a grille reverser device 29, the connection of the turbojet 2 to the pylon 12 being provided by means of a fixed upstream structure 25 of the reverser.

Guide rails 30 for the movable cowl of the reverser (see FIG. 5) are incorporated directly into the pylon 12 the rectilinear geometric shape of which facilitates this integration. Other functions of the reverser could also be integrated into the pylon 12 in order to reduce the overall weight of the nacelle 1.

The fixed upstream structure 25 comprises (see FIGS. 6 and 7) an upstream end element 26 for supporting the turbojet 2 and a downstream end element 27 for immobilizing the grilles 29 which provide a structural stiffness. These two elements 26 and 27 are structurally connected to the pylon 12 and may be made in one piece or fitted.

The grilles 29, which in this instance have a triangular pattern, are not considered structural elements and are not used in this example to provide rigidity between the two elements 26 and 27. This function is fulfilled in this instance by a trellis 28 which is placed beneath the grilles 29 and which supports the structure of the grilles 29. It is rigidly and mechanically connected to the upstream end element 26 and downstream end element 27. The trellis 28 could also be positioned above the grilles 29.

Figure 8:
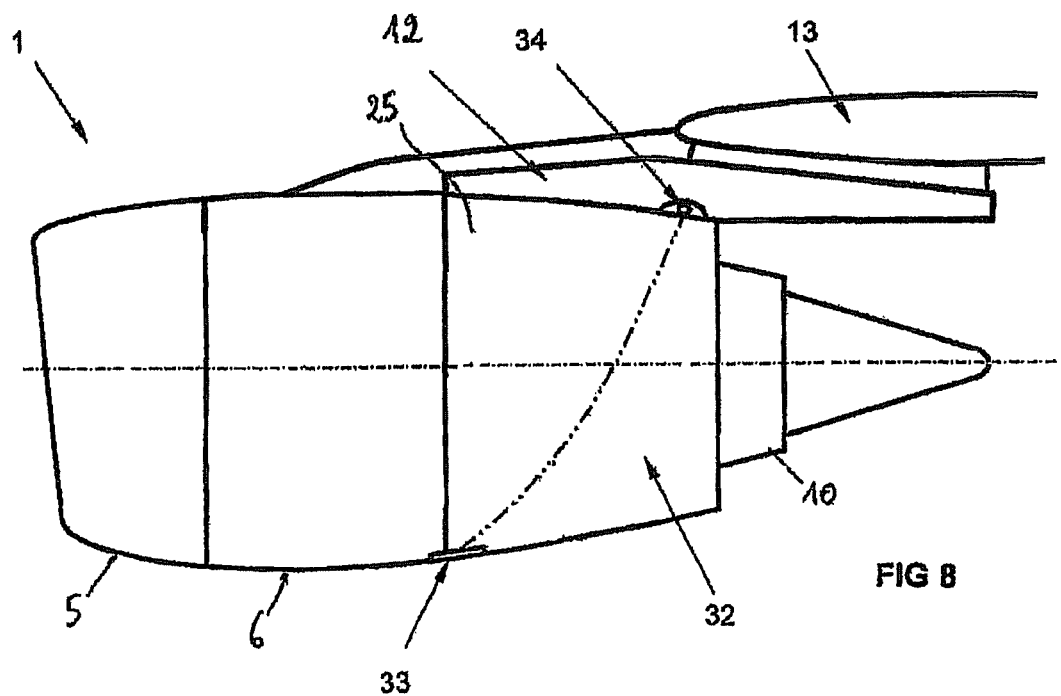
FIG. 8 is a longitudinal side view of a fourth embodiment of the invention.

In the configuration of FIG. 8, the movable cowl 32 of the reverser has a strengthened structure connecting, at the bottom portion, a point 33 for locking the fixed upstream structure 25 of the reverser to, at the top portion, a fixed point 34 of the pylon 12. This arrangement makes it possible to assist or lighten the fixed upstream structure 25 of the reverser. The fixed point 34 transmits the structural forces to the pylon 12. A locking device, preferably electric or able to be actuated remotely, of the movable cowl 32 of the reverser is provided at the fixed point 34 of the pylon 12. The point 34 could also be passive, that is to say not having direct contact with the fixed upstream structure 25 of the reverser.

Figure 9:
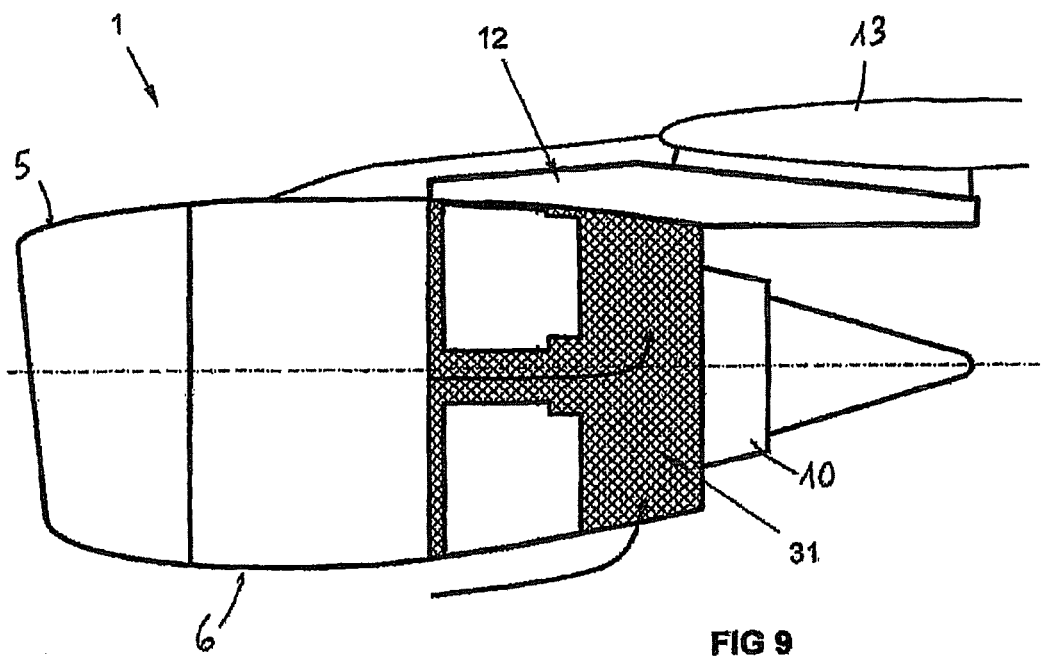
FIG. 9 is a view similar to FIG. 6 of a fifth embodiment of the invention.

FIG. 9 shows another embodiment of the invention in which the external structure 7a forms a thrust reverser with doors 31. The turbojet 2 is connected to the pylon 12 by means of a fixed upstream structure surrounding the doors of the reverser 31.

The following description will relate more particularly to the embodiment represented in FIGS. 10 to 18.

With reference to FIGS. 10 and 11, it can be seen that the propulsion assembly according to the invention comprises a nacelle 100 inside which there is a turbojet 103, the nacelle/turbojet assembly being designed to be attached beneath an aircraft wing by means of a pylon 105 (also commonly called a "mast").

With reference more particularly to FIG. 11, it can be seen that the nacelle 100 comprises on the one hand a fixed portion 107, and on the other hand a portion 109 called a cowl, mounted so as to slide longitudinally on the pylon 105.

The turbojet 103 comprises, in its upstream portion, a fan 111 and in its downstream portion an engine body 113.

As is known per se, the fan 111 is used to generate a cold air flow circulating in a zone 115 situated on the periphery of the engine body 113, and the latter generates a hot air flow coming out at very high speed through a nozzle 117.

The fan 111 is surrounded by a fan casing 119 forming a portion of the internal wall of the fixed portion of the nacelle 107.

The engine body 113 is attached to the fan casing 119 by means of a plurality of radial pillars one of which can be seen and has reference number 121 in FIG. 11.

The positioning of this pillar is said to be "at 12 o'clock" with reference to the position of the hours on a clock dial.

This very practical marking method which will be used hereinafter applies to an observer who looks at the propulsion assembly according to the invention in the direction given by the arrow Fl that can be seen in FIG. 11.

The pylon 105 is connected to the fan casing 119 via a connecting structure 123 the characteristics of which will be explained based on FIGS. 12 to 15.

As can be seen in these Figures, this connecting structure 123 comprises two annular elements 125, 127 connected together by braces 129 placed in a triangular manner, thus defining a trellis structure.

This trellis structure in reality extends only over a portion of a circle, and preferably in an envelope of the portion of a circle from 8 o'clock to 4 o'clock and passing through 12 o'clock whereof it will be supposed, as previously moreover, that they are situated in the location of the pylon 105. It is also possible to reduce this extension if the engine has pillars 149 and 145 at an angle other than 8 o'clock and 4 o'clock.

In other words, this means that the arc defined by the structure 123 measures at most 240°, or else that this structure is interrupted over a portion of a circle from 4 o'clock to 8 o'clock and passing through 6 o'clock.

The connecting structure 123 is designed in a conventional manner using the rules applicable in the field of material strength, if necessary with the aid of computer software available on the market.

Preferably, as can be seen in particular in FIGS. 14 and 15, it is possible to add to the structure two strengthening link rods 131 placed on either side of the pylon 105 and connecting the latter to the connecting structure 123.

Also provided is at least one (and preferably two) thrust-absorbing stay(s) 133, attached on the one hand to the pylon 105 and on the other hand to the engine body 113.

Advantageously, the connecting structure 123 can be made of composite material.

With reference to FIGS. 11 to 13, it can be understood that the connecting structure 123 is attached to the downstream edge 134 of the fan casing 119 by appropriate means.

The configuration of FIG. 12 is deduced from that of FIG. 10 by sliding the cowl 109 downstream of the turbojet 103, that is to say to the right of the figure.

This sliding makes it possible to expose the connecting structure 123 to the outside, and thus to apply thrust reversing means, as will be explained in greater detail below.

The configuration of FIG. 13 is deduced from that of FIG. 12 by sliding the cowl 109 further downstream, and corresponds to a maintenance situation for the propulsion assembly according to the invention.

Reference is now made more particularly to FIGS. 16 to 18, which show a propulsion assembly according to the invention when it is fully fitted.

As can be seen in FIG. 16, this propulsion assembly comprises thrust reverser grilles 135 placed in spaces situated between the braces 329.

This propulsion assembly also comprises two movable reverser structures (doors) 137, 139 for access to the engine body 113, mounted so as to pivot about shafts 141, 143 placed respectively at 4 o'clock and at 8 o'clock.

As can be seen in FIG. 18, these movable reverser structures 137, 139 are designed in order to close in the extension of the connecting structure 123, in the zone where this structure is interrupted.

These movable reverser structures may contain grilles for reversing the flow.

It will also be noted in FIG. 18 that preferably four pillars 121, 145, 147, 149 are provided interposed between the engine body 113 and the fan casing 119.

On the one hand there is the pillar 121 situated at 12 o'clock, that can be seen in FIG. 11, and on the other hand there are three pillars 145, 147, 149 placed respectively at 4 o'clock, 6 o'clock and 8 o'clock.

It is therefore possible to note that three pillars, namely the pillars placed at 12 o'clock, 4 o'clock and 8 o'clock, are situated in the same angular zone as the connecting structure 123.

The advantages of the present invention are a direct result of the foregoing description.

Because the connecting structure 123 extends over only a portion of the circumference of the downstream edge 134 of the fan casing 119, weight can be saved relative to the structure of the prior art.

The correct design of this trellis connecting structure, according to the rules of the art known to those skilled in the trade, makes it possible to achieve the desired robustness.

This robustness may be obtained with less weight if composite materials are chosen to form this connecting structure.

In addition, the interruption of this connecting structure 123 over a portion of its circumference allows easier access to the engine body 113, when the propulsion assembly according to the invention is in its maintenance configuration visible in FIG. 13.

This circumferential interruption of the connecting structure 123 also makes it possible to install movable reverser structures (protection doors) 137, 139 as has been indicated with reference to FIGS. 16 to 18.

The connecting structure 123, because of its trellis shape, is particularly suitable for installing thrust reverser grilles, which become active when the propulsion assembly according to the invention is in its configuration as shown in FIG. 12.

Note that placing the three pillars 121, 145, 149 in the same angular zone as the connecting structure 123 allows optimal transmission of the forces between the engine body 113 and this connecting structure.

Note also that the thrust-absorbing stay 133 makes it possible to transmit to the pylon 105 a portion of the thrust forces generated by the turbojet 103.

In addition, it is possible particularly to envisage that the annular element 125 attached to the downstream edge of the casing 119 extends over the whole circumference of this edge, the other annular element 127 for its part extending only over the portion of circumference situated between 8 o'clock and 4 o'clock and passing through 12 o'clock (as in the previous embodiment), the braces 129 being placed in the circumferential zone common to the two elements.

The advantage of this embodiment is that it allows the installation of movable reverser structures 137, 139 while having a more solid attachment of the connecting structure 123 to the downstream edge 134 of the casing 119.

Although the invention has been described with particular exemplary embodiments, it is evident that it is in no way limited thereto and that it includes all the technical equivalents of the means described and their combinations if the latter form part of the invention.

The invention of claimed is:

1. A nacelle for a bypass turbojet engine comprising:
an air intake upstream of the turbojet;
a middle section;
an internal casing of which is designed to surround a fan of the turbojet; and
a downstream section that is substantially tubular and that surrounds the turbojet engine, the downstream section comprising an external structure defining a secondary duct with an inner structure,
wherein the external structure is rigidly connected to a downstream portion of the casing of the fan so as to support the turbojet and has coupling means capable of allowing the nacelle to be attached to a pylon designed to be connected to a fixed structure of an aircraft.

2. The nacelle as claimed in claim 1, wherein it comprises a structure of a pylon type incorporated into the external structure and capable of allowing its attachment to the pylon.

3. The nacelle as claimed in claim 1, wherein the pylon extends over a whole length of the external structure.

4. The nacelle as claimed in claim 1, wherein the turbojet is surrounded by a primary cowl, fixed upstream of a body of the turbojet and centered downstream about an exhaust nozzle of the turbojet, independently of the external structure of the nacelle.

5. The nacelle as claimed in claim 1, wherein it comprises at least one link rod for absorbing torque forces generated by rotating members of the turbojet, said link rod connecting the pylon to an external downstream structure of the turbojet and being placed symmetrically relative to a longitudinal plane of symmetry of the nacelle.

6. The nacelle as claimed claim 5, wherein the force-absorbing link rod has an aerodynamic profile.

7. The nacelle as claimed in claim 1, wherein at least one radial pillar for connecting the body of a turbojet to the casing of the fan, notably in a top portion of the latter, is associated with a fairing provided to carry supply ducts of the turbojet.

8. The nacelle as claimed in claim 1, wherein the external structure forms a fixed cowling comprising a notably trellis framework.

9. The nacelle as claimed in claim 1, wherein the external structure comprises a thrust reverser device, a connection of the turbojet to the pylon being provided by means of a fixed upstream structure of the reverser.

10. The nacelle as claimed in claim 9, wherein the thrust reverser device is a grille reverser.

11. The nacelle as claimed in claim 10, wherein the fixed upstream structure of the grille reverser comprises an upstream end element for supporting the turbojet and a downstream end element for immobilizing the grilles, both of which being connected by a strengthening trellis placed above and/or below the grilles.

12. The nacelle as claimed in claim 10, wherein guide rails for a movable cowl of the reverser are incorporated into the pylon.

13. The nacelle as claimed in claim 9, wherein the thrust reverser device is a door reverser.

14. The nacelle as claimed in claim 9, wherein a movable cowl of the reverser has a strengthened structure connecting at least one locking point of the fixed upstream structure of the reverser with a fixed point of the pylon.

15. The nacelle as claimed in claim 14, wherein a locking device of the movable cowl of the reverser is provided at said fixed point of the pylon.

16. The nacelle as claimed in claim 1, wherein an external structure is rigidly connected to a downstream portion of the turbojet by means of a connecting structure suitable for being mounted on a downstream edge of a casing on the one hand and on a pylon on the other hand.

17. The nacelle as claimed in claim 16, wherein at least one portion of said connecting structure is interrupted over at least one portion of a circumference of this structure, preferably between 4 and 8 o'clock.

18. The nacelle as claimed in claim 16, wherein it comprises at least one movable reverser structure designed to allow access to a body of an engine of said turbojet, placed in a zone of interruption of said connecting structure and in the continuity of this structure.

19. The nacelle as claimed in claim 18, wherein it comprises two movable reverser structures for access to said engine body, mounted pivotingly about shafts situated respectively at 4 o'clock and at 8 o'clock.

20. The nacelle as claimed in claim 16, wherein said connecting structure comprises two concentric annular elements connected together by braces placed in a triangular manner, one of these two elements being designed to be fixed to the downstream edge of said casing of the fan.

21. The nacelle as claimed in claim 20, wherein the annular element designed to be fixed to the downstream edge of said casing is continuous over all its circumference, the other annular element being interrupted over a portion of its circumference, said braces being placed in a circumferential zone common to these two annular elements.

22. The nacelle as claimed in claim 20, wherein it comprises a thrust reverser comprising grilles placed in spaces situated between said braces, and a cowl capable of being mounted slidably on said pylon.

23. The nacelle as claimed in claim 22, wherein said cowl can be moved to an extreme position allowing maintenance of said turbojet.

24. The nacelle as claimed in claim 16, wherein it comprises two strengthening connecting rods capable of being interposed diagonally between said connecting structure and said pylon.

25. The nacelle as claimed in claim 16, wherein it comprises at least one thrust-absorbing stay capable of being interposed between a body of an engine of said turbojet and said pylon.

26. The nacelle as claimed in claim 16, wherein said connecting structure is formed of composite material.

27. A propulsion assembly, wherein it comprises a nacelle as claimed in claim 1, said nacelle housing a turbojet.

28. An aircraft, wherein it comprises at least one propulsion assembly as claimed in claim 27.

* * * * *